United States Patent
Zhang et al.

(10) Patent No.: US 11,954,084 B2
(45) Date of Patent: Apr. 9, 2024

(54) METHOD AND APPARATUS FOR PROCESSING TABLE, DEVICE, AND STORAGE MEDIUM

(71) Applicant: Beijing Baidu Netcom Science Technology Co., Ltd., Beijing (CN)

(72) Inventors: Yue Zhang, Beijing (CN); Yabing Shi, Beijing (CN); Ye Jiang, Beijing (CN); Chunguang Chai, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/871,666

(22) Filed: Jul. 22, 2022

(65) Prior Publication Data
US 2022/0358110 A1    Nov. 10, 2022

(30) Foreign Application Priority Data
Dec. 17, 2021 (CN) .......................... 202111554630.X

(51) Int. Cl.
*G06F 16/22* (2019.01)
*G06F 16/242* (2019.01)

(52) U.S. Cl.
CPC ...... *G06F 16/2246* (2019.01); *G06F 16/2282* (2019.01); *G06F 16/244* (2019.01)

(58) Field of Classification Search
CPC . G06F 16/2246; G06F 16/2282; G06F 16/244
See application file for complete search history.

(56) References Cited

U.S. PATENT DOCUMENTS

| | | | |
|---|---|---|---|
| 7,054,871 B2 | 5/2006 | Hu et al. | |
| 10,824,603 B2* | 11/2020 | Sastry | G06F 16/2246 |
| 10,915,546 B2* | 2/2021 | Tomlinson | G06F 16/258 |
| 11,093,473 B2* | 8/2021 | Hedberg | G06F 16/2264 |
| 11,151,149 B2* | 10/2021 | Brunel | G06F 16/9024 |
| 2003/0097384 A1 | 5/2003 | Hu et al. | |
| 2004/0015783 A1* | 1/2004 | Lennon | G06F 16/248 |
| | | | 715/255 |

(Continued)

FOREIGN PATENT DOCUMENTS

| | | |
|---|---|---|
| CN | 102096711 A | 6/2011 |
| CN | 102521416 A | 6/2012 |

(Continued)

OTHER PUBLICATIONS

Hu, Jianying et al., "Table Structure Recognition and Its Evaluation," https://www.researchgate.net/publicatoin/243773919, dated Jan. 2001, in 12 pages.

*Primary Examiner* — Merilyn P Nguyen
(74) *Attorney, Agent, or Firm* — Knobbe, Martens, Olson & Bear, LLP

(57) ABSTRACT

A method and apparatus for processing a table, a device, a storage medium and a product. An implementation of the method comprise: receiving a content query request for a target table; acquiring a target tree structure of the target table according to the content query request; where, the target tree structure is obtained by performing absorbing processing and merging processing on at least one target cell in the target table; acquiring to-be-queried content in the content query request; and querying target content matching the to-be-queried content from the target tree structure.

14 Claims, 5 Drawing Sheets

(56) References Cited

U.S. PATENT DOCUMENTS

| | | | | |
|---|---|---|---|---|
| 2004/0181543 A1* | 9/2004 | Wu | ............... | G06F 16/90328 707/999.102 |
| 2005/0060647 A1* | 3/2005 | Doan | ................. | G06F 16/25 715/205 |
| 2015/0186464 A1* | 7/2015 | Seputis | ............ | G06F 16/24539 707/718 |
| 2015/0199346 A1* | 7/2015 | Wieczorek | ......... | G06F 16/9038 707/736 |
| 2020/0057781 A1* | 2/2020 | McCormick | ........... | G06F 16/81 |
| 2020/0401798 A1 | 12/2020 | Foncubierta Rodriguez et al. | | |

FOREIGN PATENT DOCUMENTS

| | | |
|---|---|---|
| CN | 107451153 A | 12/2017 |
| CN | 110287379 A | 9/2019 |
| CN | 110928939 A | 3/2020 |

\* cited by examiner

METHOD AND APPARATUS FOR PROCESSING TABLE, DEVICE, AND STORAGE MEDIUM

CROSS-REFERENCE TO RELATED APPLICATIONS

This application claims priority to Chinese Patent Application No. 202111554630.X, filed with the China National Intellectual Property Administration (CNIPA) on Dec. 17, 2021, the content of which is incorporated herein by reference in its entirety.

TECHNICAL FIELD

The present disclosure relates to the field of knowledge graphs in the field of artificial intelligence, and in particular, to a method and apparatus for processing a table, a device, and a storage medium.

BACKGROUND

A table is a format file for storing data, which may include rows and columns, and each cell may be set as header or table content based on the data stored. There may also be a nested table in a table, and a nested table means that a part of a table is further expressed as a complete table with header and table content. In practical applications, depending on content to be expressed, nested tables may include nesting of different structures, or even more complex situations such as multiple nesting. However, in common application scenarios of tables, such as content query, data matching, the query efficiency of tables is low, especially for tables with nested tables, the query difficulty is higher and the query efficiency is lower.

SUMMARY

Embodiments of the present disclosure provide a method and apparatus for processing a table, a device, and a storage medium.

According to a first aspect of the present disclosure, a method for processing a table is provided. The method comprises: receiving a content query request for a target table; obtaining a target tree structure of the target table according to the content query request; wherein, the target tree structure is obtained by performing absorbing processing and merging processing on at least one target cell in the target table; obtaining to-be-queried content in the content query request; and querying, from the target tree structure, target content matching the to-be-queried content.

According to a second aspect, some embodiments of the present disclosure provide an electronic device. The device includes: at least one processor; and a memory communicatively connected to the at least one processor; where the memory stores instructions executable by the at least one processor, and the instructions, when executed by the at least one processor, cause the at least one processor to perform the method according to the first aspect.

According to a third aspect, some embodiments of the present disclosure provide a non-transitory computer readable storage medium, the computer instructions are used to cause a computer to perform the method according to the first aspect.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not constitute a limitation to the present disclosure. In which.

DETAILED DESCRIPTION OF EMBODIMENTS

Figure 1:
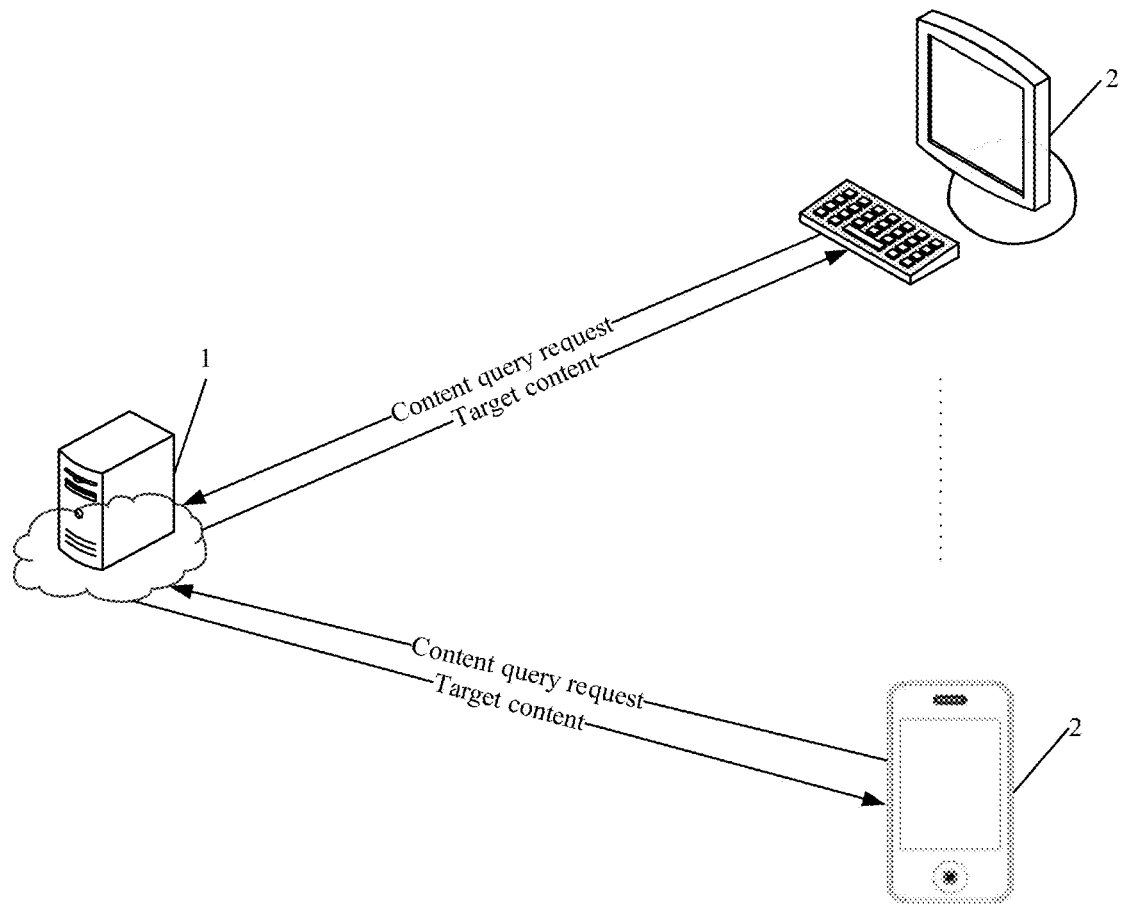
FIG. 1 is a system architecture diagram of a method for processing a table provided according to a first embodiment of the present disclosure.

Example embodiments of the present disclosure are described below with reference to the accompanying drawings, where various details of embodiments of the present disclosure are included to facilitate understanding, and should be considered merely as examples. Therefore, those of ordinary skills in the art should realize that various changes and modifications can be made to the embodiments described here without departing from the scope of the present disclosure. Similarly, for clearness and conciseness, descriptions of well-known functions and structures are omitted in the following description.

The technical solution of the present disclosure provides a method and apparatus for processing a table, a device, a storage medium and a product, which may be applied to the field of knowledge graphs in the field of artificial intelligence. By obtaining a tree structure of a table, the table may be queried by using the tree structure, and a table query efficiency is improved.

In the prior art, a table may be composed of a plurality of cells, and data may be stored in the cells. In order to query data from the table, table content is analyzed based on input data of the table and the table to complete query of the table content. The input data may include, for example, header positions, nested table positions. The positions of headers and nested tables may usually be specified manually, which puts higher requirements on the input table-related data. However, for a table identification method performed by specifying table header position and nested table position, the input content is complicated, and during identification, the position needs to be used for analysis, and a query efficiency is low.

In order to solve the above technical problem, Embodiments of the present disclosure consider converting a table into a tree, to implement a data structure with the tree as the querying basis, so as to improve the query efficiency of data. The conversion between the table and the tree structure may be realized through processing such as absorbing processing and merging processing on the table.

In an embodiment of the present disclosure, when receiving a content query request for a target table, a target tree structure of the target table may be acquired according to the content query request. The target tree structure is obtained by performing absorbing processing and merging processing on at least one target cell (or, a plurality of target cells) in the target table, and may include all cells in the target table. When acquiring to-be-queried content in the content query request, target content matching the to-be-queried content may be queried from the target tree structure. Nodes in the target tree structure actually correspond to corresponding target cells, and quick query of the content may be implemented based on a connection relationship between the nodes. There is no need to enter a header position or an embedded table position, and quick query of the table may be implemented by directly using the target tree structure.

The technical solution of the present disclosure will be described in detail below with reference to the accompanying drawings.

FIG. 1 is a system architecture diagram of a method for processing a table provided according to a first embodiment of the present disclosure. In this system architecture diagram, an electronic device 1 and a user equipment 2 that is connected to the electronic device 1 via a local area network or a wide area network may be included. The electronic device 1 may be, for example, a common server, a cloud server, etc., and the user equipment 2 may be, for example, a mobile phone, a tablet computer, a computer, a notebook, a supercomputer device, and the like. Types of the electronic device 1 and the user equipment 2 are not limited in embodiments of the present disclosure.

The electronic device 1 may provide a table query service to the user equipment 2. The user equipment 2 may detect a content query request initiated by a user, and send the content query request to the electronic device 1, and the electronic device 1 may obtain target content based on the method for processing a table provided by embodiments of the present disclosure, and feed back the target content to the user equipment 2, and the user equipment 2 outputs the target content for the user.

Figure 2:
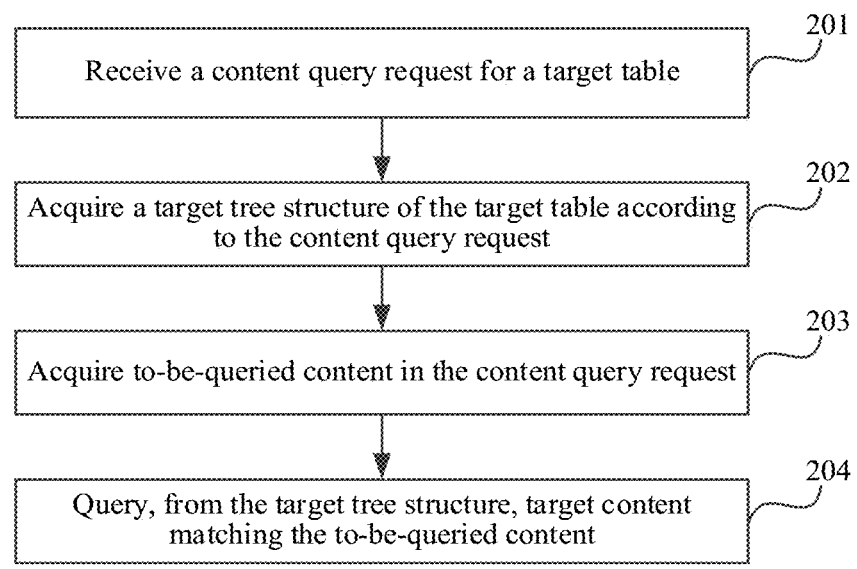
FIG. 2 is a flowchart of the method for processing a table provided according to a second embodiment of the present disclosure.

As shown in FIG. 2, a flowchart of the method for processing a table provided according to a second embodiment of the present disclosure is illustrated. The method may be performed by an apparatus for processing a table, and the apparatus may be located in the electronic device, and the method for processing a table may include the following steps:

201: receiving a content query request for a target table.

Alternatively, the content query request may be detected by the user equipment and sent to the electronic device.

The content query request may include to-be-queried content.

202: obtaining a target tree structure of the target table according to the content query request. The target tree structure is obtained by performing absorbing and merging processing on at least one target cell (or, a plurality of target cells) in the target table.

When acquiring the content query request, the target table corresponding to the content query request may be determined, and the target tree structure of the target table may be obtained.

Alternatively, the target tree structure of the target table may be generated in real time, or may be generated in advance. For generation steps, reference may be made to relevant steps in the embodiment shown in FIG. 3. For example, in a possible design, the corresponding target tree structure may be generated from the target table in advance, and the target tree structure may be stored in a disk. When the target table corresponding to the content query request is determined, the tree structure corresponding to the target table may be read from the disk.

203: acquiring to-be-queried content in the content query request.

204: querying target content matching the to-be-queried content from the target tree structure.

Alternatively, the querying target content matching the to-be-queried content from the target tree structure may include: querying, starting from a root node of the target tree structure and according to a node connection relationship of the target tree structure, a target node matching the to-be-queried content from the target tree structure, and obtaining target content corresponding to the target node.

Alternatively, the target tree structure $n_h$ may be represented as a multi-way tree, leaf nodes of the tree structure $n_h$ may be cells of content type in the at least one target cell (or, a plurality of target cells), and non-leaf nodes of the tree structure $n_h$ may be cells of header type in the at least one target cell.

Alternatively, the root node in the target tree structure may be a target parent node of the final merging, and the root node does not contain actual node content, but is a virtual node and does not need to be corresponding to a header.

In this embodiment of the present disclosure, when receiving a content query request for the target table, the target tree structure of the target table may be acquired according to the content query request. The target tree structure is obtained by performing absorbing processing and merging processing on at least one target cell in the target table, and may include all cells in the target table. When acquiring the to-be-queried content in the content query request, target content matching the to-be-queried content may be queried from the target tree structure. Nodes in the target tree structure actually correspond to corresponding target cells, and quick query of the content my be implemented based on connection relationships between the nodes. There is no need to enter a header position or an embedded table position, and quick query of the table may be implemented by directly using the target tree structure.

Figure 3:
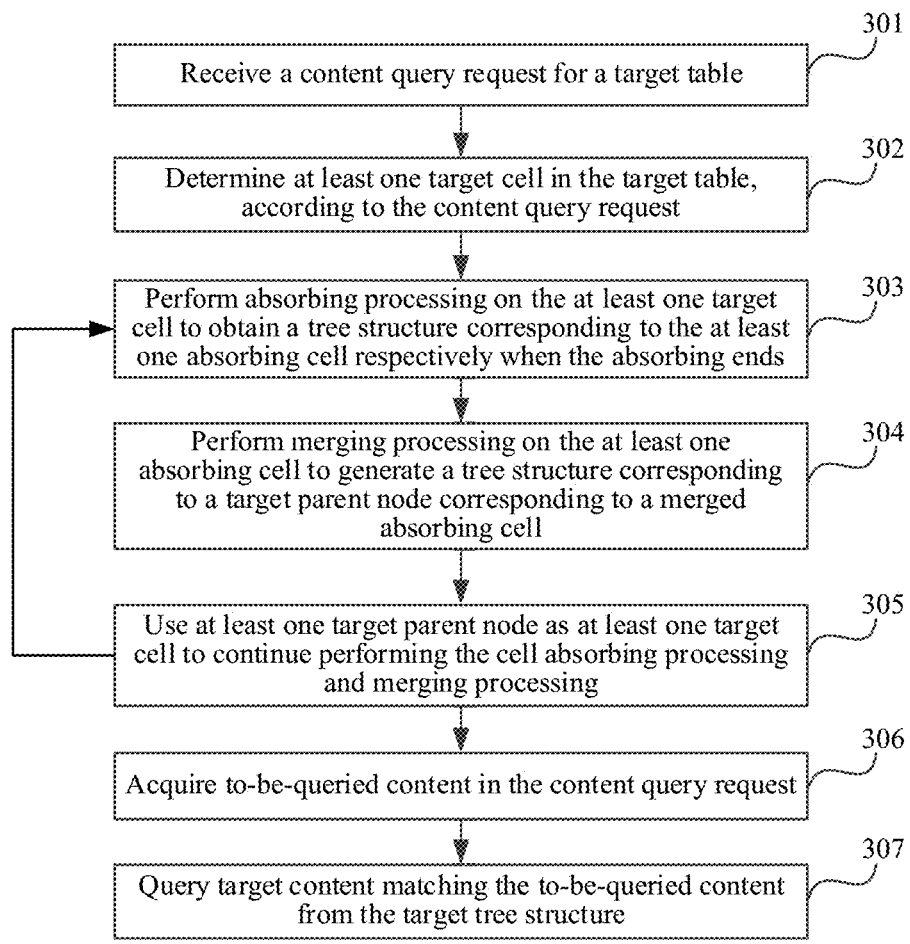
FIG. 3 is a flowchart of the method for processing a table provided according to a third embodiment of the present disclosure.

As shown in FIG. 3, a flowchart of the method for processing a table provided according to a third embodiment of the present disclosure is illustrated. The method may be performed by an apparatus for processing a table, and the apparatus may be located in the electronic device, and the method for processing a table may include the following steps:

301: receiving a content query request for a target table.

302: determining at least one target cell (or, a plurality of target cells) in the target table according to the content query request.

303: performing absorbing processing on the at least one the target cell (or, a plurality of target cells) to obtain a tree structure corresponding to at least one absorbing cell respectively when the absorbing ends.

The tree structure of any absorbing cell may include the absorbing cell and a cell absorbed by the absorbing cell. The absorbing cell may be a parent node in the tree structure corresponding to the absorbing cell, and the cell absorbed by the absorbing cell may be a child node in the tree structure corresponding to the absorbing cell. The absorbing cell and the cell absorbed by the absorbing cell are in a parent-child node relationship.

304: performing merging processing on at least one absorbing cell, to generate a tree structure corresponding to a target parent node corresponding to a merged absorbing cell.

The target parent node may be a merged absorbing cell, and merged absorbing cells are in sibling relationship and correspond to the same target parent node.

305: using at least one target parent node as at least one target cell to continue performing the cell absorbing processing and merging processing until all cells are merged into one target tree structure, and obtaining the target tree structure corresponding to the table.

306: acquiring to-be-queried content in the content query request.

307: querying target content matching the to-be-queried content from the target tree structure.

In this embodiment of the present disclosure, when the target tree structure of the target table is obtained, at least one target cell (or, a plurality of target cells) in the target table may be determined and absorbing processing may be performed on the at least one target cell (or, the plurality of target cells), to obtain the tree structure corresponding to at least one absorbing cell respectively when the absorbing ends, realizing initial absorption for the at least one target cell (or, a plurality of target cells), so that a header and corresponding content in the table are formed into a corresponding tree structure. Then, merging processing may be performed on at least one absorbing cell, to generate the tree structure of the target parent node corresponding to the merged absorbing cells. Realizing merging of the absorbing cells to obtain a tree structure containing more cells. The steps of absorbing processing and merging processing are performed continuously on at least one target parent node, until all cells are merged into a target tree structure, to obtain the target tree structure corresponding to the table, realizing fast and accurate generation of the tree structure of the table.

As an embodiment, the determining at least one target cell (or, a plurality of target cells) in the table includes:

determining the at least one target cell (or, a plurality of target cells) in the table and determining an absorbing direction corresponding to the at least one target cell (or, the plurality of target cells) respectively; the absorbing direction includes: downward absorbing or rightward absorbing;

the performing absorbing processing on the at least one target cell, to obtain a tree structure corresponding to at least one absorbing cell respectively when the absorbing ends, includes:

performing absorbing processing on the at least one target cell (or, the plurality of target cells) based on the absorbing direction corresponding to the at least one target cell respectively, to obtain the tree structure corresponding to the at least one absorbing cell respectively when the absorbing processing ends; and the performing merging processing on the at least one absorbing cell to generate a tree structure corresponding to the target parent node corresponding to the merged absorbing cells, includes:

performing, according to the absorbing direction corresponding to the at least one the absorbing cell respectively, merging processing on the tree structure corresponding to the at least one absorbing cell respectively, to generate the tree structure corresponding to the target parent node corresponding to the merged absorbing cell.

Alternatively, absorbing processing may refer to a process of controlling a to-be-absorbed target cell to become a child node of an absorbing target cell. Merging processing may refer to a process of controlling a to-be-merged absorbing cell to become a sibling node of a merging cell.

In this embodiment of the present disclosure, after the absorbing direction corresponding to the at least one target cell (or, a plurality of target cells) is determined respectively, absorbing processing may be performed on the at least one target cell based on the absorbing direction corresponding to at least one target cell respectively, to obtain the tree structure corresponding to at least one absorbing cell respectively when the absorbing ends, realizing the absorption of the at least one target cell based on the absorbing direction to ensure an absorption accuracy. During the merging processing, merging processing may be performed on the tree structure corresponding to the at least one absorbing cell respectively based on the absorbing direction corresponding to at least one absorbing cell respectively, to generate the tree structure corresponding to the target parent node corresponding to the merged absorbing cell, realizing efficient merging of absorbing cells. Using the absorbing processing and merging processing corresponding to at least one target cell respectively, accurate generation of the target tree structure of the target table may be accurately achieved.

In some embodiments, the performing absorbing processing on the at least one target cell based on the absorbing direction corresponding to the at least one target cell respectively, to obtain the tree structure corresponding to the at least one absorbing cell where absorbing ends respectively, includes:

traversing the at least one target cell (or, the plurality of target cells), and before the traversing ends, performing following steps on a current target cell currently being traversed;

if the current target cell satisfies a parent node selection condition, using the current target cell as an absorbing cell, determining a corresponding to-be-absorbed cell based on an absorbing direction of the absorbing cell, generating a tree structure corresponding to the absorbing cell with the absorbing cell as a parent node and with the to-be-absorbed cell as a child node, and continuing to traverse a next unabsorbed target cell until the traversing ends; or if the current target cell does not satisfy the parent node selection condition, using the current target cell directly as an absorbing cell, and traversing a next target cell until the traversing ends; and obtaining the tree structure corresponding to the at least one absorbing cell respectively when the absorbing processing ends.

Alternatively, the parent node selection condition may include that the cell is a header. In the table, a header may correspond to at least one cell of the content type, and each cell may store table content. The to-be-absorbed cell may be at least one cell which corresponds to the current target cell of the header type. The to-be-absorbed cell may be at least one.

In this embodiment of the present disclosure, when performing absorbing processing on at least one target cell or a plurality of target cells, at least one target cell may be traversed, and at the end of the traversing, it may be determined whether the current target cell currently being traversed satisfies the parent node selection condition, so that when the current target cell satisfies the parent node selection condition, the current target cell may be used as an absorbing cell, the corresponding to-be-absorbed cell may be determined based on the absorbing direction of the absorbing cell, the tree structure corresponding to the absorbing cell may be generated with the absorbing cell as the parent node and with the to-be-absorbed cell as the child node, and then the next target cell may be traversed until the traversing ends. When the current target cell does not satisfy the parent node selection condition, the current target cell may be directly used as an absorbing cell, and the next target cell may be traversed directly until the traversing ends. By traversing the at least one target cell or the plurality of target cells, determination on absorbable may be made for each target cell, which realizes accurate absorption of the target cell and improves an absorption efficiency of the tree structure of the target cell.

In a possible design, the method also includes:

determining a table type corresponding to the at least one target cell respectively; where the table type includes: a header type or a content type.

The determining a corresponding to-be-absorbed cell based on an absorbing direction of the absorbing cell, includes: based on the absorbing direction of the absorbing cell, querying and determining a target cell whose table type is the content type and located preceding a first target cell of the header type in the absorbing direction as the to-be-absorbed cell.

Alternatively, a candidate absorbing cell corresponds to an absorption order respectively, and the absorption order may be determined based on a row number or a column number of the cell. The querying corresponding at least one candidate absorbing cell located in the absorbing direction of the absorbing cell, includes: querying at least one to-be-absorbed cell which is located in the absorbing direction of the absorbing cell and is preceding a first cell of the header type located in the absorbing direction of the absorbing cell. For example, if the absorbing cell is located at the first row, third column, and the cell in the second row, third column is of the content type, and the cell in the third row and third column is of the header type, then it may be determined that the cell in the second row and third column is the to-be-absorbed cell.

In this embodiment of the present disclosure, during the absorbing processing, based on the absorbing direction of the absorbing cell, a cell in the absorbing direction and absorbable by the absorbing cell may be queried and determined as to-be-absorbed cell. In order to ensure the accuracy of absorption, a node type of at least one candidate absorbing cell is determined, so that when a cell is of the content type and is located preceding a next header type cell, the cell may be determined as a to-be-absorbed cell, which realizes accurate determination of to-be-absorbed cells, in turn improves the absorption accuracy and absorption precision of absorbing cells.

In another possible design, the determining a corresponding to-be-absorbed cell based on an absorbing direction of the absorbing cell, includes:

querying and determining a target cell whose table type is the header type and located in the absorbing direction as the to-be-absorbed cell.

Alternatively, the to-be-absorbed cell may be a merging cell and a to-be-merged cell under a virtual parent node. In this regard, the absorbing cell may replace the virtual parent node of the merging cell and the to-be-merged cell, so that the absorbing cell absorbs the merging cell and the to-be-merged cell.

In this embodiment of the present disclosure, the target cell which is located in the absorbing direction of the absorbing cell and is of the header type may be used as the to-be-absorbed cell, which may ensure accurate absorption of the to-be-absorbed cell.

In another possible design, the generating the tree structure corresponding to the absorbing cell with the absorbing cell as a parent node and with the to-be-absorbed cell as a child node, includes:

generating the tree structure with the absorbing cell as the parent node and with at least one to-be-absorbed cell as the child node.

In the tree structure corresponding to the absorbing cell, the absorbing cell is the parent node, and the at least one to-be-absorbed cell is the child node.

In this embodiment of the present disclosure, when generating the tree structure for the absorbing cell and the to-be-absorbed cell, the tree structure with the absorbing cell as the parent node and with the at least one to-be-absorbed cell as child node may be generated, so as to realize accurate generation of the tree structure.

In a possible design, after the performing absorbing processing on the at least one target cell to obtain a tree structure corresponding to at least one absorbing cell respectively when the absorbing ends, the method may further include:

updating a row area or a column area of the absorbing cell in the table, based on a row area and a column area of a current absorption area of the absorbing cell in the table, and based on the absorbing direction of the absorbing cell and a number of absorbed at least one to-be-absorbed cell, to obtain a target absorption area corresponding to the absorbing cell; and establishing a corresponding relationship between the target absorbing area and the tree structure corresponding to the absorbing cell.

Alternatively, the absorption area of an absorbing cell may be constituted by the row and column area of the absorbing cell and the row and column area of the to-be-absorbed cell absorbed by the absorbing cell.

Typically, after the absorbing cell absorbs the to-be-absorbed cell, the corresponding cell area changes accordingly. When absorbing downward, a row number of the table area changes and an ending row d changes. When absorbing rightward, a column number of the table area changes and an ending column r changes. For example, when "event content" in Table 1 absorbs "consumption time", "consumption condition" and "preferential items", the corresponding table area changes from <3,5,1,2> to <3,5,1,5>.

In this embodiment of the present disclosure, when updating the row area or the column area of the absorbing cell in the table, based on the row area and the column area of the current absorption area of the absorbing cell in the table, and based on the absorbing direction of the absorbing cell and the number of absorbed at least one to-be-absorbed cell, the absorption area corresponding to the absorbing cell is updated, the target absorption area is obtained, thereby establishing the corresponding relationship between the target absorption area and the tree structure corresponding to the absorbing cell. By determining the target absorption area of the absorbing cell, the absorption area of the absorbing cell may be accurately determined, so that when establishing a target tree decoupling strand, the tree structure is made corresponding to the absorption area to avoid repeated absorption and improve the accuracy of absorption.

As an alternative method, when obtaining the absorbing direction corresponding to at least one target cell respectively, the method may further include:

determining the table type corresponding to the at least one target cell respectively. The table type includes: the header type or the content type.

Whether the current target cell satisfies the parent node selection condition may be determined by:

If the table type of the current target cell is the header type, determining that the current target cell satisfies the parent node selection condition.

If the table type of the current target cell is the content type, determining that the current target cell does not satisfy the parent node selection condition.

If the table type of the current target cell is the content type, determining that the current target cell is a to-be-absorbed cell.

In this embodiment of the present disclosure, when the table type corresponding to at least one of the target cell is obtained respectively, whether the current target cell satisfies the parent node selection condition may be accurately determined according to the table type, so as to determine the current target cell of the header type as satisfying the parent node selection condition, determine the current target cell of the content type as not satisfying the parent node selection condition, realizing accurate and effective distinction of parent nodes by using header and content, improving an accuracy of parent node selection, and effectively improving the accuracy of the generation of the tree structure.

The target cells may include header-type cells or content-type cells.

For ease of understanding, the technical solution of the present disclosure will be described in detail with reference to the table below.

TABLE 1

| Event time | Event location | | Event content | |
|---|---|---|---|---|
| October 2021 | Beijing | | Book signing | |
| September 2021 | Shanghai | Consumption time | Consumption condition | Preferential items |
| | | August 2021 | Over 1000 | Giving gift vouchers |
| | | September 2021 | Over 1000 | Bonus points |

Table 1 includes a nested table:

| Consumption time | Consumption condition | Preferential items |
|---|---|---|
| August 2021 | Over 1000 | Giving gift vouchers |
| September 2021 | Over 1000 | Bonus points |

In the prior art, if it is required to query the table, the header positions of event time, event location, event content, etc., as well as the header positions of the nested table such as consumption time, consumption condition, and preferential items need to be determined. This has a negative impact on the query efficiency of the table, and is not conducive to improving the query efficiency.

In order to improve the query efficiency of the table, a target tree structure of the table may be generated.

First, at least one target cell in the target table may be acquired, that is, each cell of "event time", "event location", "event content", "October 2021" to "extra points", etc. In combination with the row areas and the column areas of the cells, the target cell is obtained. The target cell may correspond to a cell area formed by the row area and the column area of the cell.

After the at least one target cell is obtained, a cell type and an absorbing direction may be predicted for the at least one target cell, and the table type and the absorbing direction corresponding to the at least one target cell may be obtained. For a method for predicting the table type and the absorbing direction, reference may be made to the descriptions in the following embodiments.

The table type may include: a header type or a content type. A target cell of header type may be expressed as: $h_{l,r,u,d}$ and a to-be-absorbed table may be expressed as $c_{l,r,u,d}$. Here, l represents a starting row of the cell, r represents an ending row of the cell, u represents a starting column of the cell, and d represents an ending column of the cell. A cell may be represented as a table area composed of headers from the $l^{th}$ column to the $r^{th}$ column and/or the $u^{th}$ row to the $d^{th}$ row. Here, the row area may be the $u^{th}$ row to the $d^{th}$ row, and the column area may be the $l^{th}$ column to the $r^{th}$ column.

In a traversing process, a target cell of the header type that exists independently may become a parent node of other target cells, cannot not become a child node of other target cells, and may become a sibling node of other target cells. When being merged into child nodes of a virtual parent node, the target cell of the header type can become a child node of other target cells. A cell of content type can become a child node of another cell, cannot become a parent node of another target cell, and can become a sibling node of another target cell.

Figure 4:
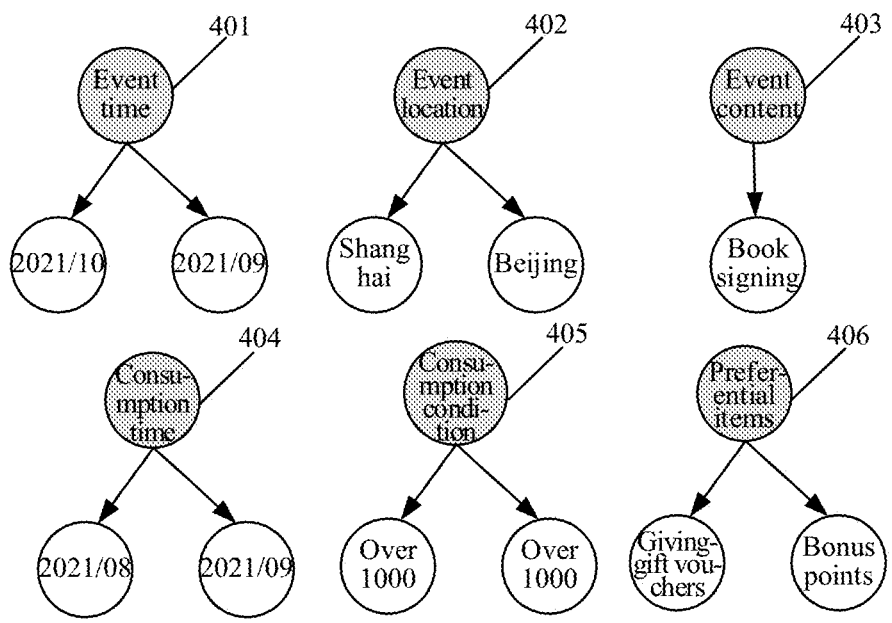
FIG. 4 is an example diagram of a tree structure obtained by table absorption provided according to an embodiment of the present disclosure.

In the at least one target cell, a target cell of header type may be determined as an absorbing cell that satisfies the parent node selection condition, and a target cell of the content type may be determined as a to-be-absorbed cell that does not satisfy the parent node selection condition. For example, "event time" is of header type and its absorbing direction is absorbing downward, then, when "event time" is used as the current target cell, it may be determined that "October 2021" and "September 2021" below the "event time" are to-be-absorbed cells corresponding to the current target cell, that is, corresponding to the absorbing cell. The absorbing cell is used to absorb the to-be-absorbed cells, and the absorbing cell is used as a parent node, the to-be-absorbed cells are used as child nodes. In this regard, the tree structure corresponding to the absorbing cell may be obtained. As shown in FIG. 4, an example diagram of a tree structure obtained by table absorption may include: absorbing cell: "event time", to-be-absorbed cells: "October 2021" and "September 2021", a corresponding tree structure 401; absorbing cell: "event location", and to-be-absorbed cells: "Shanghai" and "Beijing", a corresponding tree structure 402; absorbing cell: "event content", and to-be-absorbed cell: "book signing", a corresponding tree structure 403; absorbing cell: "consumption time", and to-be-absorbed cells: "August 2021" and "September 2021", a corresponding tree structure 404; absorbing cell: "consumption condition", and to-be-absorbed cells: "over 1000", "over 1000", a corresponding tree structure 405; absorbing cell: "preferential items", and to-be-absorbed cells: "giving gift vouchers" and "bonus points", a corresponding tree structure 406.

After a first absorption ends, the tree structure corresponding to at least one absorbing node respectively may be obtained, so that merging processing may be performed on the tree structure corresponding to the at least one absorbing node to obtain the tree structure corresponding to at least one target parent node. For the specific merging process, reference may be made to the detailed introduction of merging steps in the following embodiment.

In some embodiments, performing merging processing on at least one absorbing cell based on the absorbing direction corresponding to at least one absorbing cell respectively, to generate the tree structure corresponding to the target parent node corresponding to the merged absorbing cell, includes:

traversing at least one absorbing cell, and performing following steps on a current target cell currently being traversed before the traversing ends;

if a current absorbing cell satisfies a sibling node selection condition, using the current absorbing cell as a merging cell, determining a to-be-merged cell based on an absorbing direction of the merging cell, generating the tree structure corresponding to the target parent node with the merging cell and the to-be-merged cell as sibling nodes, and continuing to traverse a next unmerged absorbing cell until the traversing ends; or if the current target cell does not satisfy a sibling node selection condition, traversing a next absorbing cell until the traversing ends; and acquiring the tree structure corresponding to at least one of the target parent node respectively when the merging ends.

Performing merging processing on at least one of the absorbing cell may include: performing merging processing on the tree structure corresponding to at least one of the absorbing cell respectively. After the absorbing process, the absorbing cell is the absorbing node, and the absorbing node may include cell information of the absorbing cell, such as cell area and content.

Performing merging processing on the tree structure corresponding to at least one of the absorbing cell respectively includes: merging tree structures of absorbing cells that can be used as sibling nodes in at least one of the absorbing cell.

In this embodiment of the present disclosure, when performing merging processing on the tree structure corresponding to at least one of the absorbing cell respectively, the at least one absorbing cell may be traversed, and before the traversing ends, the step of determining whether the current absorbing cell satisfies the sibling node selection condition is performed on the current target cell currently being traversed. By determining whether the current absorbing cell satisfies the sibling node selection condition, determinization of whether merge the absorbing cell in the corresponding absorbing direction of the current absorbing cell is made, so as to accurately determine the merging condition of the current absorbing cell and realize accurate generation of the tree structure of the current absorbing cell, thus improving the merging efficiency and accuracy of the tree structure.

In a possible design, the determining a corresponding to-be-absorbed cell based on an absorbing direction of the absorbing cell, includes:

determining a row area and a column area of a cell area corresponding to the merging cell;

determining, from at least one of the absorbing cell, at least one candidate to-be-merged cell whose absorbing direction is same as a merging direction of the merging cell;

determining, from the at least one candidate to-be-merged cell, a candidate to-be-merged cell whose row area is same as the row area of the merging cell, to obtain the to-be-merged cell; or, determining, from the at least one candidate to-be-merged cell, a candidate to-be-merged cell whose column area is same as the column area of the merging cell, to obtain the to-be-merged cell.

Assuming that the cell area of a merging cell is $<l_2, r_2, u_2, d_2>$, and a cell area of any absorbing cell is $<l_1, r_1, u_1, d_1>$, then the absorbing cell may be determined as a to-be-merged cell when $l_2=l_1$ and $r_1=r_2$, or the absorbing cell may be determined as a to-be-merged cell when $u_1=u_2$ and $d_1=d_2$.

For ease of understanding, also using Table 1 as an example, after obtaining the tree structure corresponding to at least one absorbing cell respectively, "consumption time", "consumption condition", and "preferential items" may be used as merging cells, the merging directions thereof are all to merge to the right, and the row areas of "consumption time", "consumption condition", and "preferential items" are same, then the "consumption time", "consumption condition" and "preferential items" may be determined as sibling nodes of each other. In judgment order, "consumption time" is determined before "consumption condition" and "preferential items", in this regard, "consumption time" is the current absorbing cell and determined as a merging cell, and "consumption condition" and "preferential items" are the to-be-merged cells.

In this embodiment of the present disclosure, when determining the corresponding to-be-absorbed cell based on the absorbing direction of the absorbing cell, at least one candidate to-be-merged cell whose absorbing direction is the same as the merging direction of the merging cell may be first determined from at least one of the absorbing cell. If in a cell area corresponding to the at least one candidate to-be-merged cell, a row area of a candidate to-be-merged cell is the same as the row area of the merging cell, then the to-be-merged cell may be obtained; or, if in a cell area corresponding to the at least one candidate to-be-merged cell, a column area of a candidate to-be-merged cell is the same as the column area of the merging cell, then the to-be-merged cell may be obtained. By merging cells which are in the same row area, or merging cells which are in the same column area, accurate merging of cells may be achieved, invalid merging may be avoided, and merging accuracy may be improved.

As an alternative implementation, the generating the tree structure corresponding to the target parent node with the merging cell and the to-be-merged cell as sibling nodes, may include:

ascertaining a target parent node for the merging cell and the to-be-merged cell; and generating the tree structure corresponding to the target parent node, with the target parent node as a parent node, and with the merging cell and the to-be-merged cell as sibling nodes.

The target parent node may be a virtual parent node generated for the merging cell and the to-be-merged cell.

In Table 1, "event time", "event location" and "event content" satisfy that the absorbing directions thereof are the same, which are all downward absorbing, but no header is found above their merged area, then it may be determined that a virtual parent node is to be generated "for event time", "event location" and "event content". Since "event time" is the element in the first row and first column of the table, then the virtual parent node may be used as the root node of the table.

Then, unmerged absorbing cells in Table 1 may continue to be traversed, and the "consumption time" is determined as the current merging cell, and "consumption condition" and "preferential items" are determined as the to-be-merged cells, then a virtual parent node may be determined for the "consumption time", "consumption condition" and "preferential items".

Figure 5:
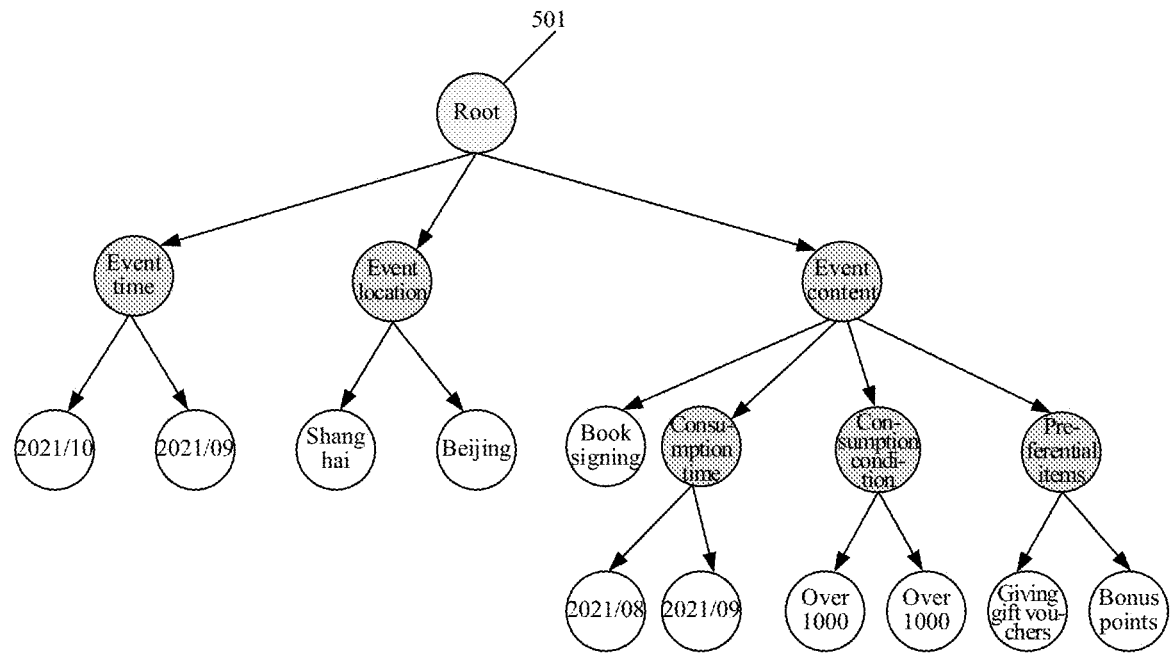
FIG. 5 is an example diagram of a target tree structure provided according to an embodiment of the present disclosure.

In addition, in some embodiments, after obtaining the tree structure corresponding to the target parent node, if there are multiple target parent nodes, the target parent nodes may be used as new at least one target cell, and the cell absorbing processing and merging processing on the new at least one target cell may be continued until all cells are merged into one target tree structure. For example, after the virtual parent node is generated for the "consumption time", "consumption condition" and "preferential items", then the "event time", "event location" and "event content" may be subject to the determination on the absorbable thereof respectively. If the "event content" is used as an absorbing cell, then the "consumption time", "consumption condition" and "preferential items" in the absorbing direction of the "event content" may be determined as to-be-absorbed cells of the absorbing cell "event content", and "event content" is controlled to absorb the "consumption time", "consumption condition" and "preferential items". However, "event content" is already a child node of the root node, and there are no remaining absorbing cells in this regard. Therefore, a target tree structure 501 corresponding to Table 1 as shown in FIG. 5 is obtained.

In this embodiment of the present disclosure, during merging cells, a target parent node may be generated for the merging cell and the to-be-merged cell. During generating the tree structure corresponding to the target parent node with the target parent node as the parent node and with the merging cell and the to-be-merged cell as sibling nodes, an accurate tree structure may be obtained, and accurate merging of the merging cell and the to-be-merged cell may be achieved.

In a possible design, after the merging cells, the method further includes:
  if the to-be-merged cell is a cell in a same row area as the merging cell, controlling the column area corresponding to the merging cell to merge up a column area of the to-be-merged cell, to obtain a merged area corresponding to the merging cell; or,
  if the to-be-merged cell is a cell in a same column area as the merging cell, controlling the row area corresponding to the merging cell to merge up a row area of the to-be-merged cell, to obtain a merged area corresponding to the merging cell; and
  establishing an association relationship between the tree structure corresponding to the target parent node and the merged area.

Alternatively, the merged area may be formed by combining respective areas of a merging node and a to-be-merged node. When the tree structure of the target parent node is established, a corresponding table area of the target parent node changes accordingly. Typically, the row area or column area in the absorbing direction changes accordingly. For example, when the "consumption time", "consumption condition" and "preferential items" in Table 1 are merged, the merged area is <3,5,3,5>.

In this embodiment of the present disclosure, when merging cells, if the to-be-merged cell is a cell in the same row area as the merging cell, the column area corresponding to the merging cell may be controlled to merge up the column area of the to-be-merged cell. Or, if the to-be-merged cell is a cell in the same column area as the merging cell, the row area corresponding to the merging cell may be controlled to merge up the row area of the to-be-merged cell to obtain the merged area corresponding to the merging cell. By establishing the association relationship between the tree structure corresponding to the target parent node and the merged area, an accurate corresponding relationship between the merged area and the tree structure may be obtained, repeated or invalid merging may be avoided, and the merging efficiency and accuracy may be improved.

In some embodiments, the determining the at least one target cell in the table and an absorbing direction corresponding to at least one of the target cell respectively, includes:
  reading sequentially each table element in the table according to a reading order of left-to-right and top-to-bottom, to obtain the at least one target cell; and
  inputting the at least one target cell into a table discriminant model respectively, to obtain a table type and the absorbing direction corresponding to at least one of the target cell respectively.

The table discriminant model may include neural network models. The at least one target cell is sequentially input into the table discriminant model to obtain the table type and the absorbing direction corresponding to the at least one target cell respectively.

In this embodiment of the present disclosure, by reading sequentially each table element in the table according to the reading order of left-to-right and top-to-bottom, the at least one target cell may be obtained, so as to achieve accurate reading of each table element in the table. By inputting the at least one target cell respectively into the table discriminant model, the table type and the absorbing direction corresponding to the at least one target cell respectively may be obtained, so as to achieve accurate absorption of the at least one target cell according to the table type and the absorbing direction corresponding to the at least one target cell respectively.

As a possible implementation, model processing steps of the inputting any target cell respectively into a table discriminant model includes:
  determining, for any target cell, a cell below the target cell and a cell on the right of the target cell;
  inputting the target cell and the cell below the target cell into a first feature model of the table discriminant model, to obtain a first feature;
  inputting the target cell and the cell on the right of the target cell into a second feature model of the table discriminant model, to obtain a second feature; and
  inputting the first feature and the second feature into a classifier of the table discriminant model, to obtain the table type and the absorbing direction of the target cell.

The table discriminant model may include a pre-trained first feature model, a pre-trained second feature model, and a classifier. The first feature model and the second feature model may be pre-trained language models, which may perform language feature recognition on the input target cell and the cell below the target cell or the cell on the right of the target cell to obtain the corresponding features. The first feature and the second feature may be phrase pair features.

Alternatively, the inputting the first feature and the second feature into a classifier of the table discriminant model to obtain the table type and the absorbing direction of the target cell, may include: splicing the first feature and the second feature to obtain a to-be-classified feature; inputting the to-be-classified feature into the classifier to obtain a probability of being a header, and an absorbing direction. If the probability of being a header is greater than a preset probability threshold, it may be determined that the corresponding target cell is of the header type; otherwise, it may be determined that the corresponding target cell is of the content type.

In this embodiment of the present disclosure, for any target cell, the cell below the target cell and the cell on the right of the target cell may be determined, and feature extraction is performed on the cell below the target cell and the cell on the right of the target cell respectively, to obtain the first feature and the second feature, so that the first feature and the second feature are input into the classifier. The target cell may be accurately classified by the first feature model, the second feature model and the classifier in the table discriminant model, to obtain the table type thereof and the absorbing direction thereof. Through the accurate table type and absorbing direction, the table may be accurately absorbed and merged, and an accuracy of the target tree structure may be improved.

As another embodiment, after the obtaining the tree structure of the target table, the method may further include:
aggregating nodes satisfying an aggregation relationship in the target tree structure into a same node set; obtaining at least one of the node set corresponding to the target tree structure; where, the node set includes at least one node having the aggregation relationship.

Alternatively, a node set may be represented as a cluster of nodes, and may include at least one node having the aggregation relationship in the target tree structure. At least one node having the aggregation relationship may mean that table contents of the nodes have a content association or a content constraint relationship, and belong to the same piece of data.

Figure 6:
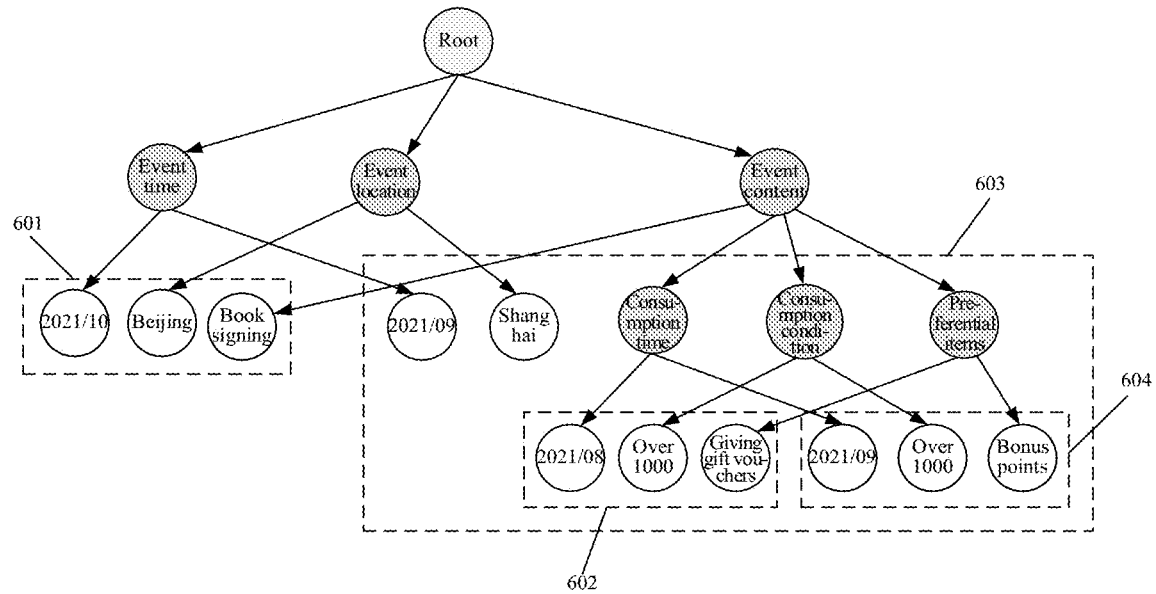
FIG. 6 is an example diagram of a node set provided according to an embodiment of the present disclosure.

For ease of understanding, as shown in FIG. 6, node sets 601-604 are obtained after aggregation is performed on the target tree structure 501 corresponding to Table 1.

In this embodiment of the present disclosure, aggregating the nodes satisfying the aggregation relationship in the target tree structure into the same node set, may ensure that nodes having association relationship can be managed collectively, to implement associated query of nodes and improve query efficiency and accuracy.

Figure 7:
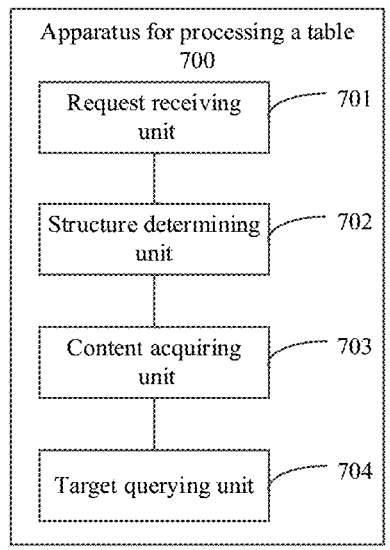
FIG. 7 is a schematic structural diagram of an apparatus for processing a table provided according to a fourth embodiment of the present disclosure.

As shown in FIG. 7, a schematic structural diagram of an apparatus for processing a table provided according to a fourth embodiment of the present disclosure is illustrated, the apparatus may be located in the electronic device, and the apparatus for processing a table may include the following units:

A request receiving unit 701: is configured to receive a content query request for a target table.

A structure determining unit 702: is configured to obtain a target tree structure of the target table according to the content query request; wherein, the target tree structure is obtained by performing absorbing processing and merging processing on at least one target cell in the target table.

A content acquiring unit 703: is configured to obtain to-be-queried content in the content query request.

A target querying unit 704: is configured to query, from the target tree structure, target content matching the to-be-queried content.

Figure 8:
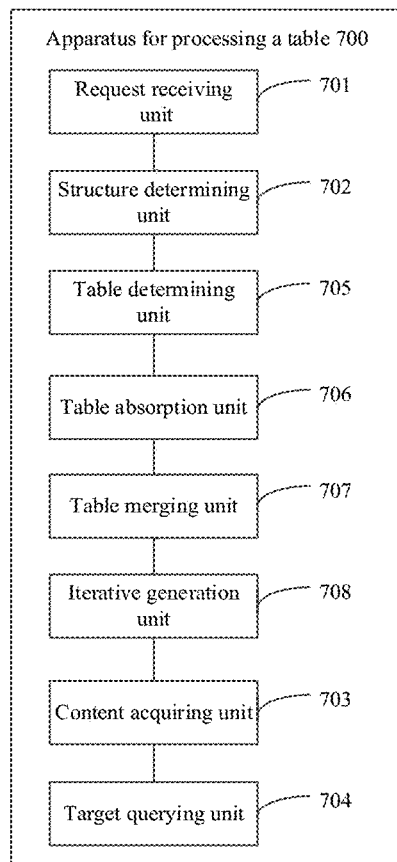
FIG. 8 is a schematic structural diagram of an apparatus for processing a table provided according to a fifth embodiment of the present disclosure.

In order to obtain an accurate target tree structure, as shown in FIG. 8, in a possible design, the apparatus may further include the following units in addition to the structure shown in FIG. 7:

A table determining unit 705: is configured to determine the at least one target cell in the target table.

A table absorption unit 706: is configured to perform absorbing processing on the at least one target cell, to obtain a tree structure corresponding to at least one absorbing cell respectively when the absorbing processing ends.

A table merging unit 707: is configured to perform merging processing on the at least one absorbing cell, to generate a tree structure corresponding to a target parent node corresponding to a merged absorbing cell.

An iterative generation unit 708: is configured to use at least one target parent node as at least one target cell to continue performing the absorbing processing and merging processing until all cells are merged into one target tree structure, to obtain the target tree structure corresponding to the table.

As an embodiment, the table determining unit includes:
a first determining unit, configured to determine the at least one target cell in the table and determining an absorbing direction corresponding to the at least one of the target cell respectively; wherein, the absorbing direction comprises: downward absorbing or rightward absorbing;

the table absorption unit includes:
a table absorption module, configured to perform absorbing processing on the at least one target cell based on the absorbing direction corresponding to the at least one target cell respectively, to obtain the tree structure corresponding to the at least one absorbing cell respectively when absorbing ends; and the table merging unit includes:
a table merging module, configured to perform, according to the absorbing direction corresponding to the at least one absorbing cell respectively, merging processing on the tree structure corresponding to the at least one absorbing cell respectively, to generate the tree structure corresponding to the target parent node corresponding to the merged absorbing cell.

In some embodiments, the table absorption module includes:
a first traversal submodule, configured to traverse the at least one target cell, and performing following operations on a current target cell being traversed before the traversing ends;
a first processing submodule, configured to, if the current target cell satisfies a parent node selection condition, use the current target cell as an absorbing cell, determine a corresponding to-be-absorbed cell based on an absorbing direction of the absorbing cell, generate a tree structure corresponding to the absorbing cell with the absorbing cell as a parent node and with the to-be-absorbed cell as a child node, and continue to traverse a next unabsorbed target cell until the traversing ends; or
a second processing submodule, configured to, if the current target cell does not satisfy a parent node selection condition, use the current target cell directly as an absorbing cell, and traverse a next target cell until the traversing ends; and
obtain the tree structure corresponding to the at least one absorbing cell respectively when the absorbing processing ends.

In a possible design, the apparatus further includes:
a type determining unit, is configured to determine a table type corresponding to the at least one target cell respectively; wherein the table type comprises: a header type or a content type.

The first processing submodule is configured to:
query and determine a target cell of the content type and located preceding a first target cell of the header type in the absorbing direction of the absorbing cell as the to-be-absorbed cell of the absorbing cell.

In another possible design, the first processing submodule is configured to:
query and determine a target cell of the header type and located in the absorbing direction of the absorbing cell as the to-be-absorbed cell.

As an alternative embodiment, the apparatus further includes:
an area absorption unit, configured to update a row area or a column area of the absorbing cell in the table, based on a row area and a column area of a current absorbing area of the absorbing cell in the table, and based on the absorbing direction of the absorbing cell and a number of absorbed at least one to-be-absorbed cell, to obtain a target absorption area corresponding to the absorbing cell; and
a first establishing unit, configured to establish a corresponding relationship between the target absorption area and the tree structure corresponding to the absorbing cell.

In some embodiments, the apparatus further includes:
a type determining unit, configured to determine a table type corresponding to the at least one target cell respectively; wherein the table type comprises: a header type or a content type; and
whether the current target cell satisfies the parent node selection condition is determined by:
if the table type of the current target cell is the header type, determine that the current target cell satisfies the parent node selection condition; or
if the table type of the current target cell is the content type, determine that the current target cell does not satisfy the parent node selection condition.

In some possible designs, the table merging module includes:
a second traversal submodule, configured to traverse the at least one absorbing cell, and perform following operations on a current target cell being traversed before the traversing ends;
a third processing submodule, configured to, if a current absorbing cell satisfies a sibling node selection condition, use the current absorbing cell as a merging cell, determine a to-be-merged cell based on an absorbing direction of the merging cell, generate the tree structure corresponding to the target parent node with the merging cell and the to-be-merged cell as sibling nodes, and continue to traverse a next unmerged absorbing cell until the traversing ends; or
a fourth processing submodule, configured to, if the current target cell does not satisfy a sibling node selection condition, traverse a next absorbing cell until the traversing ends; and
acquiring the tree structure corresponding to at least one of the target parent node where merging ends respectively.

In another possible design, the third processing submodule is configured to:
determine a row area and a column area of a cell area corresponding to the merging cell;
determine, from at least one absorbing cell, at least one candidate to-be-merged cell whose absorbing direction is same as a merging direction of the merging cell;
determine, from the at least one candidate to-be-merged cell, a candidate to-be-merged cell whose row area is same as the row area of the merging cell, to obtain the to-be-merged cell; or, determine, from the at least one candidate to-be-merged cell, a candidate to-be-merged cell whose column area is same as the column area of the merging cell, to obtain the to-be-merged cell.

As an alternative embodiment, the third processing submodule is configured to:
ascertain a target parent node for the merging cell and the to-be-merged cell; and
generate the tree structure corresponding to the target parent node, with the target parent node as a parent node, and with the merging cell and the to-be-merged cell as the sibling nodes.

As another alternative embodiment, the apparatus further includes:
a first merging unit, configured to, if the to-be-merged cell is a cell in a same row area as the merging cell, control the column area corresponding to the merging cell to merge up a column area of the to-be-merged cell, to obtain a merged area corresponding to the merging cell; or,
a second merging unit, configured to, if the to-be-merged cell is a cell in a same column area as the merging cell, control the row area corresponding to the merging cell to merge up a row area of the to-be-merged cell, to obtain a merged area corresponding to the merging cell; and
establish an association relationship between the tree structure corresponding to the target parent node and the merged area.

As another embodiment, the table determining unit includes:
an order reading module, configured to read sequentially each table element in the table according to a reading order of left-to-right and top-to-bottom, to obtain the at least one target cell; and
a cell discriminant module, configured to input the at least one target cell into a table discriminant model respectively, to obtain a table type and the absorbing direction corresponding to the at least one target cell respectively.

In a possible design, the cell discriminant module includes:
a first determining submodule, configured to determine, for any target cell, an underlying cell and a right cell of the target cell;
a first input submodule, configured to input the target cell and the below cell of the target cell into a first feature model of the table discriminant model, to obtain a first feature;
a second input submodule, configured to input the target cell and the right cell of the target cell into a second feature model of the table discriminant model, to obtain a second feature; and
a feature classification submodule, configured to input the first feature and the second feature into a classifier of the table discriminant model, to obtain the table type and the absorbing direction of the target cell.

In some embodiments, the apparatus further includes:
a node aggregation unit, configured to aggregate nodes satisfying an aggregation relationship in the target tree structure into a same node set; obtain at least one node set corresponding to the target tree structure; wherein the node set comprises at least one node having the aggregation relationship.

The apparatus for processing a table in embodiments of the present disclosure may perform the method for processing a table in the foregoing embodiments, and the steps performed by the units, modules, and submodules will be omitted herein.

It should be noted that the table in the present embodiment is not a table for a specific user, and cannot reflect the personal information of a specific user. It should be noted that the table in the present embodiment is from a public dataset.

In the technical solution of the present disclosure, the collection, storage, use, processing, transmission, provision and disclosure of the user personal information involved are all in compliance with the relevant laws and regulations, and do not violate public order and good customs.

According to an embodiment of the present disclosure, an electronic device, a readable storage medium, and a computer program product are also provided.

According to an embodiment of the present disclosure, a computer program product is provided, and the computer program product includes: a computer program, the computer program is stored in a readable storage medium, and at least one processor in the electronic device may read the computer program from the readable storage medium, and the at least one processor executes the computer program so that the electronic device executes the solution provided by any of the foregoing embodiments.

Figure 9:
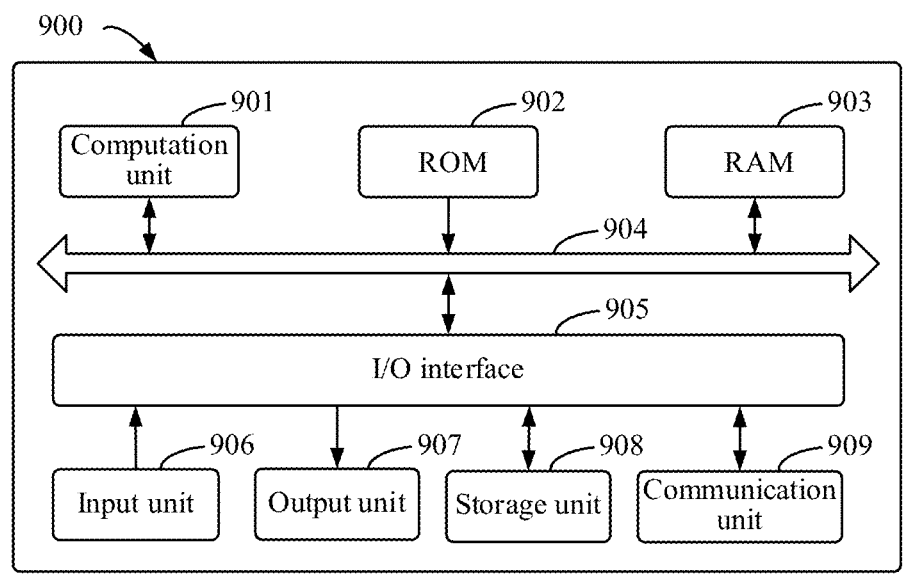
FIG. 9 is a block diagram of an electronic device used to implement the method for processing a table according to embodiments of the present disclosure.

FIG. 9 illustrates a schematic block diagram of an example electronic device 900 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The parts shown herein, their connections and relationships, and their functions are merely examples, and are not intended to limit the implementation of the present disclosure described and/or claimed herein.

As shown in FIG. 9, the device 900 includes a computation unit 901, which may perform various appropriate actions and processing, based on a computer program stored in a read-only memory (ROM) 902 or a computer program loaded from a storage unit 908 into a random access memory (RAM) 903. In the RAM 903, various programs and data required for the operation of the device 900 may also be stored. The computation unit 901, the ROM 902, and the RAM 903 are connected to each other through a bus 904. An input/output (I/O) interface 905 is also connected to the bus 904.

A plurality of parts in the device 900 are connected to the I/O interface 905, including: an input unit 906, for example, a keyboard and a mouse; an output unit 907, for example, various types of displays and speakers; the storage unit 908, for example, a disk and an optical disk; and a communication unit 909, for example, a network card, a modem, or a wireless communication transceiver. The communication unit 909 allows the device 900 to exchange information/data with other devices over a computer network such as the Internet and/or various telecommunication networks.

The computation unit 901 may be various general-purpose and/or dedicated processing components having processing and computing capabilities. Some examples of the computation unit 901 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 901 performs the various methods and processes described above, such as a method for processing a table. For example, in some embodiments, the method for processing a table may be implemented as a computer software program, which is tangibly included in a machine readable medium, such as the storage unit 908. In some embodiments, part or all of the computer program may be loaded and/or installed on the device 900 via the ROM 902 and/or the communication unit 909. When the computer program is loaded into the RAM 903 and executed by the computation unit 901, one or more steps of the method for processing a table described above may be performed. Alternatively, in other embodiments, the computation unit 901 may be configured to perform the method for processing a table by any other appropriate means (for example, by means of firmware).

Various embodiments of the systems and technologies described above herein may be implemented in digital electronic circuit systems, integrated circuit systems, field programmable gate arrays (FPGA), application specific integrated circuits (ASIC), application specific standard products (ASSP), system on chip (SOC), load programmable logic devices (CPLD), computer hardware, firmware, software, and/or combinations thereof. These various embodiments may include being implemented in one or more computer programs that may be executed and/or interpreted on a programmable system including at least one programmable processor, which may be a dedicated or general programmable processor that may receive data and instructions from a storage system, at least one input device, and at least one output device, and transmit data and instructions to the storage system, the at least one input device, and the at least one output device.

The program code for implementing the methods of the present disclosure may be written in any combination of one or more programming languages. These program codes can be provided to the processor or controller of general computer, dedicated computer or other programmable data processing device, so that when executed by the processor or controller, the program code enables the functions/operations specified in the flow chart and/or block diagram to be implemented. The program code can be executed completely on the machine, partially on the machine, partially on the machine and partially on the remote machine as a separate software package, or completely on the remote machine or server.

In the context of the present disclosure, a machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or an LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a cloud server, also known as a cloud computing server or a cloud host, which is a host product in the cloud computing service system to solve the problem of traditional physical hosts and VPS services ("Virtual Private Server", or "VPS" for short), such as the defects of difficult management and weak business expansion. The server may also be a server of a distributed system, or a server combined with a blockchain.

It should be understood that the various forms of processes shown above may be used to reorder, add, or delete steps. For example, the steps disclosed in embodiments of the present disclosure may be executed in parallel, sequentially, or in different orders, as long as the desired results of the technical solutions mentioned in embodiments of the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the principle of the present disclosure should be encompassed within the scope of protection of the present disclosure.

What is claimed is:

1. A method for processing a table, the method comprising:

receiving a content query request for a target table;

obtaining a target tree structure of the target table according to the content query request; wherein, the target tree structure is obtained by performing absorbing processing and merging processing on at least one target cell in the target table;

obtaining to-be-queried content in the content query request; and querying, from the target tree structure, target content matching the to-be-queried content;

wherein obtaining the target tree structure comprises:

determining the at least one target cell in the target table;

performing absorbing processing, on the at least one target cell to obtain a tree structure corresponding to at least one absorbing cell respectively at an end of the absorbing processing;

performing merging processing on the at least one absorbing cell, to generate a tree structure corresponding, to a target parent node corresponding to a merged absorbing cell; and using at least one target parent node as at least one target cell to continue performing the absorbing processing and merging processing until all cells are merged into one target tree structure, to obtain the target tree structure corresponding to the table;

wherein determining at least one target cell in the table, comprises:

determining the at least one target cell in the table and determining an absorbing direction corresponding to the at least one target cell respectively; wherein the absorbing direction comprises:

downward absorbing or rightward absorbing;

performing absorbing processing on the at least one target cell to obtain the tree structure corresponding to at least one absorbing cell respectively at the end of the absorbing processing comprises:

performing absorbing processing on the at least one target cell based on the absorbing direction corresponding to the at least one target cell respectively, to obtain the tree structure corresponding to the at least one absorbing cell respectively at the end of the absorbing processing; and performing merging processing on the at least one absorbing cell, to generate a tree structure corresponding to the target parent node corresponding to the merged absorbing cell comprises:

performing, according to the absorbing direction corresponding to the at least one absorbing cell respectively, merging processing on the tree structure corresponding to the at least one absorbing cell respectively, to generate the tree structure corresponding to the target parent node corresponding to the merged absorbing cell;

wherein performing absorbing processing on the at least one target cell further comprises:

traversing the at least one target cell, and performing a plurality of operations on a current target cell being traversed before an end of the traversal, the operations comprising:

responsive to determining that the current target cell satisfies a parent node selection condition, using the current target cell as an absorbing cell, determining a corresponding to-be-absorbed cell based on an absorbing direction of the absorbing cell, generating a tree structure corresponding to the absorbing cell with the absorbing cell as a parent node and with the to-beabsorbed cell as a child node, and continuing to traverse a next unabsorbed target cell until the end of the traversal; or responsive to determining that the current target cell does not satisfy a parent node selection condition, using the current target cell directly as an absorbing cell, and traversing a next target cell until the end of the traversal; and obtaining the tree structure corresponding to the at least one absorbing cell respectively at the end of the absorbing processing.

2. The method according to claim 1, further comprising:

determining a table type corresponding to the at least one target cell respectively; wherein the table type comprises: a header type or a content type; and determining the corresponding to-be-absorbed cell based on the absorbing direction of the absorbing cell, comprises:

querying and determining a target cell of the content type and located preceding a first target cell of the header type in the absorbing direction of the absorbing cell as the to-be-absorbed cell of the absorbing cell.

3. The method according to claim 2, wherein determining the corresponding to-be-absorbed cell based on the absorbing direction of the absorbing cell further comprises:

querying and determining a target cell of the header type and located in the absorbing direction of the absorbing cell as the to-be-absorbed cell.

4. The method according to claim 3, further comprising:

updating a row area or a column area of the absorbing cell in the table, based on a row area and a column area of a current absorbing area of the absorbing cell in the table, and based on the absorbing direction of the absorbing cell and a number of absorbed at least one to-be-absorbed cell, to obtain a target absorption area corresponding to the absorbing cell; and establishing a corresponding relationship between the target absorption area and the tree structure corresponding to the absorbing cell.

5. The method according to claim 1, wherein the method further comprises:

determining a table type corresponding to the at least one target cell respectively; wherein the table type comprises: a header type or a content type; and wherein, whether the current target cell satisfies the parent node selection condition is determined by:

responsive to determining that the table type of the current target cell is the header type, determining that the current target cell satisfies the parent node selection condition; or responsive to determining that the table type of the current target cell is the content type, determining that the current target cell does not satisfy the parent node selection condition.

6. The method according to claim 1, wherein performing merging processing on the at least one absorbing cell further comprises:

traversing the at least one absorbing cell, and performing a plurality of operations on a current target cell being traversed before an end of the traversal, the operations comprising:

responsive to determining that a current absorbing cell satisfies a sibling node selection condition, using the current absorbing cell as a merging cell, determining a to-be-merged cell based on an absorbing direction of the merging cell, generating the tree structure corresponding to the target parent node with the merging cell and the to-be-merged cell as sibling nodes, and continuing to traverse a next unmerged absorbing cell until the end of the traversal; or responsive to determining that the current target cell does not satisfy a sibling node selection condition, traversing a next absorbing cell until the end of the traversal; and acquiring the tree structure corresponding to at least one target parent node respectively at the end of the traversal.

7. The method according to claim 6, wherein determining the to-be-merged cell based on the absorbing direction of the merging cell, comprises:

determining a row area and a column area of a cell area corresponding to the merging cell;

determining, from at least one absorbing cell, at least one candidate to-be-merged cell whose absorbing direction is same as a merging direction of the merging cell;

determining, from the at least one candidate to-be-merged cell, a candidate to-be-merged cell whose row area is same as the row area of the merging cell, to obtain the to-be-merged cell;

or, determining, from the at least one candidate to-be-merged cell, a candidate to-be-merged cell whose column area is same as the column area of the merging cell, to obtain the to-be-merged cell.

8. The method according to claim 7, wherein generating the tree structure corresponding to the target parent node with the merging cell and the to-be-merged cell as sibling nodes, comprises:

ascertaining a target parent node for the merging cell and the to-be-merged cell; and generating the tree structure corresponding to the target parent node, with the target parent node as a parent node, and with the merging cell and the to-be-merged cell as the sibling nodes.

9. The method according to claim 8, wherein the method further comprises:

responsive to determining that the to-be-merged cell is a cell in a same row area as the merging cell, controlling the column area corresponding to the merging cell to merge up a column area of the to-be-merged cell, to obtain a merged area corresponding to the merging cell; or, responsive to determining that the to-be-merged cell is a cell in a same column area as the merging cell, controlling the row area corresponding to the merging cell to merge up a row area of the to-be-merged cell, to obtain a merged area corresponding to the merging cell; and establishing an association relationship between the tree structure corresponding to the target parent node and the merged area.

10. The method according to claim 1, wherein determining the at least one target cell in the table and an absorbing direction corresponding to at least one target cell respectively, comprises:

reading sequentially each table element in the table according to a reading order of left-to-right and top-to-bottom, to obtain the at least one target cell; and inputting the at least one target cell into a table discriminant model respectively, to obtain a table type and the absorbing direction corresponding to the at least one target cell respectively.

11. The method according to claim 10, wherein, model processing operations of inputting the at least one target cell respectively into the table discriminant model comprises:

determining, for any target cell, a below cell of the target cell and a right cell of the target cell;

inputting the target cell and the below cell of the target cell into a first feature model of the table discriminant model, to obtain a first feature;

inputting the target cell and the right cell of the target cell into a second feature model of the table discriminant model, to obtain a second feature; and inputting the first feature and the second feature into a classifier of the table discriminant model, to obtain the table type and the absorbing direction of the target cell.

12. The method according to claim 1, wherein after obtaining the target tree structure corresponding to the table, the method further comprises:

aggregating nodes satisfying an aggregation relationship in the target tree structure into a same node set; obtaining at least one node set corresponding to the target tree structure; wherein the node set comprises at least one node having the aggregation relationship.

13. An electronic device, comprising:

at least one processor, and a memory communicatively connected to the at least one processor;

wherein the memory is configured to store a plurality of instructions executable by the at least one processor, and the instructions are configured cause the processor to perform operations comprising:

receiving a content query request for a target table;

obtaining a target tree structure of the target table according to the content query request; wherein, the target tree structure is obtained by performing absorbing processing and merging processing on at least one target cell in the target table;

obtaining to-be-queried content in the content query request; and querying, from the target tree structure, target content matching the to-be-queried content;

wherein obtaining the target tree structure comprises:

determining the at least one target cell in the target table;

performing absorbing processing on the at least one target cell to obtain a tree structure corresponding to at least one absorbing cell respectively at an end of the absorbing processing;

performing merging processing on the at least one absorbing cell, to generate a tree structure corresponding to a target parent node corresponding to a merged absorbing cell; and using at least one target parent node as at least one target cell to continue performing the absorbing processing and merging processing until all cells are merged into one target tree structure, to obtain the target tree structure corresponding to the table;

wherein determining at least one target cell in the table, comprises:

determining the at least one tarot cell in the table and determining, an absorbing direction corresponding to the at least one target cell respectively; wherein the absorbing direction comprises:

downward absorbing or rightward absorbing;

performing absorbing processing on the at least one target cell to obtain the tree structure corresponding to at least one absorbing cell respectively at the end of the absorbing processing comprises:

performing absorbing processing on the at least one target cell based on the absorbing direction corresponding to the at least one target cell respectively, to obtain the tree structure corresponding to the at least one absorbing cell respectively at the end of the absorbing processing; and performing merging processing on the at least one absorbing cell, to generate a tree structure corresponding to the target parent node corresponding to the merged absorbing cell comprises:

performing, according to the absorbing direction corresponding to the at least one absorbing cell respectively, merging processing on the tree structure corresponding to the at least one absorbing cell respectively, to generate the tree structure corresponding to the target parent node corresponding to the merged absorbing cell;

wherein performing absorbing processing on the at least one target cell further comprises:

traversing the at least one target cell, and performing, a plurality of operations on a current target cell being traversed before an end of the traversal, the operations comprising:

responsive to determining that the current target cell satisfies a parent node selection condition, using the current target cell as an absorbing cell, determining a corresponding to-be-absorbed cell based on an absorbing direction of the absorbing cell, generating a tree structure corresponding to the absorbing cell with the absorbing cell as a parent node and with the to-be-absorbed cell as a child node, and continuing to traverse a next unabsorbed target cell until the end of the traversal; or responsive to determining that the current target cell does not satisfy a parent node selection condition, using the current target cell directly as an absorbing cell, and traversing a next target cell until the end of the traversal; and obtaining the tree structure corresponding to the at least one absorbing cell respectively at the end of the absorbing processing.

14. A non-transitory computer readable storage medium configured to store a plurality of computer instructions, wherein the instructions, when executed, cause a computer to perform operations comprising:

receiving a content query request for a target table;

obtaining a target tree structure of the target table according to the content query request; wherein, the target tree structure is obtained by performing absorbing processing and merging processing on at least one target cell in the target table;

obtaining to-be-queried content in the content query request; and querying, from the target tree structure, target content matching the to-be-queried content;

wherein obtaining the target tree structure comprises:

determining the at least one target cell in the target table;

performing absorbing processing on the at least one target cell to obtain a tree structure corresponding to at least one absorbing cell respectively at an end of the absorbing processing;

performing merging processing on the at least one absorbing cell, to generate a tree structure corresponding to a target parent node corresponding to a merged absorbing cell; and using at least one target parent node as at least one target cell to continue performing the absorbing processing and merging processing until all cells are merged into one target tree structure, to obtain the target tree structure corresponding to the table;

wherein determining at least one target cell in the table, comprises:

determining the at least one target cell in the table and determining, an absorbing direction corresponding to the at least one target cell respectively; wherein the absorbing direction comprises:

downward absorbing or rightward absorbing;

performing absorbing processing on the at least one target cell to obtain the tree structure corresponding to at least one absorbing cell respectively at the end of the absorbing processing comprises:

performing absorbing processing on the at least one target cell based on the absorbing direction corresponding to the at least one target cell respectively, to obtain the tree structure corresponding to the at least one absorbing cell respectively at the end of the absorbing processing; and performing merging processing on the at least one absorbing cell, to generate a tree structure corresponding to the target parent node corresponding to the merged absorbing cell comprises:

performing, according to the absorbing direction corresponding to the at least one absorbing cell respectively, merging processing on the tree structure corresponding to the at least one absorbing cell respectively, to generate the tree structure corresponding to the target parent node corresponding to the merged absorbing cell;

wherein performing absorbing processing on the at least one target cell further comprises:

traversing the at least one target cell, and performing a plurality of operations on a current target cell being traversed before an end of the traversal, the operations comprising:

responsive to determining that the current target cell satisfies a parent node selection condition, using the current target cell as an absorbing cell, determining a corresponding to-be-absorbed cell based on an absorbing direction of the absorbing cell, generating a tree structure corresponding to the absorbing cell with the absorbing cell as a parent node and with the to-be-absorbed cell as a child node, and continuing to traverse a next unabsorbed target cell until the end of the traversal; or responsive to determining that the current target cell does not satisfy a parent node selection condition, using the current target cell directly as an absorbing cell, and traversing a next target cell until the end of the traversal; and obtaining the tree structure corresponding to the at least one absorbing cell respectively at the end of the absorbing processing.

* * * * *